United States Patent [19]

Strause

[11] Patent Number: 5,790,739
[45] Date of Patent: Aug. 4, 1998

[54] OPTICAL FIBER INTERCONNECT AND CANISTER CLOSURE ASSEMBLY

[75] Inventor: Kevin L. Strause, Keller, Tex.

[73] Assignee: Siecor Corporation, Hickory, N.C.

[21] Appl. No.: 576,531

[22] Filed: Dec. 21, 1995

[51] Int. Cl.[6] ................................................ G02B 6/36
[52] U.S. Cl. .................................................... 385/135
[58] Field of Search ................................ 385/134–137

[56] References Cited

U.S. PATENT DOCUMENTS

| | | | |
|---|---|---|---|
| 5,185,845 | 2/1993 | Jones | 385/135 |
| 5,278,933 | 1/1994 | Hunsinger et al. | 385/135 |
| 5,323,480 | 6/1994 | Mullaney et al. | 385/135 |

FOREIGN PATENT DOCUMENTS

| | | | |
|---|---|---|---|
| 0105597A2 | 4/1984 | European Pat. Off. | 385/135 |
| 2150313A | 6/1985 | United Kingdom | 385/135 |

*Primary Examiner*—John D. Lee
*Attorney, Agent, or Firm*—Wesley T. Noah

[57] ABSTRACT

An optical fiber interconnect and canister closure assembly is provided for interconnecting optical fiber cables in a canister closure. The assembly comprises a canister and end cap that closes over one end of the canister. Extending from the end cap to be received in the canister is a longitudinal interconnect assembly that comprises a longitudinal adapter mount. A plurality of adapters are mounted along the adapter mount in a row. The assembly is further provided with fiber management guides along a portion of the interconnect assembly that allow any pigtail of a set of equal length pigtails to be interconnected to any adapter mounted on the adapter mount.

17 Claims, 4 Drawing Sheets

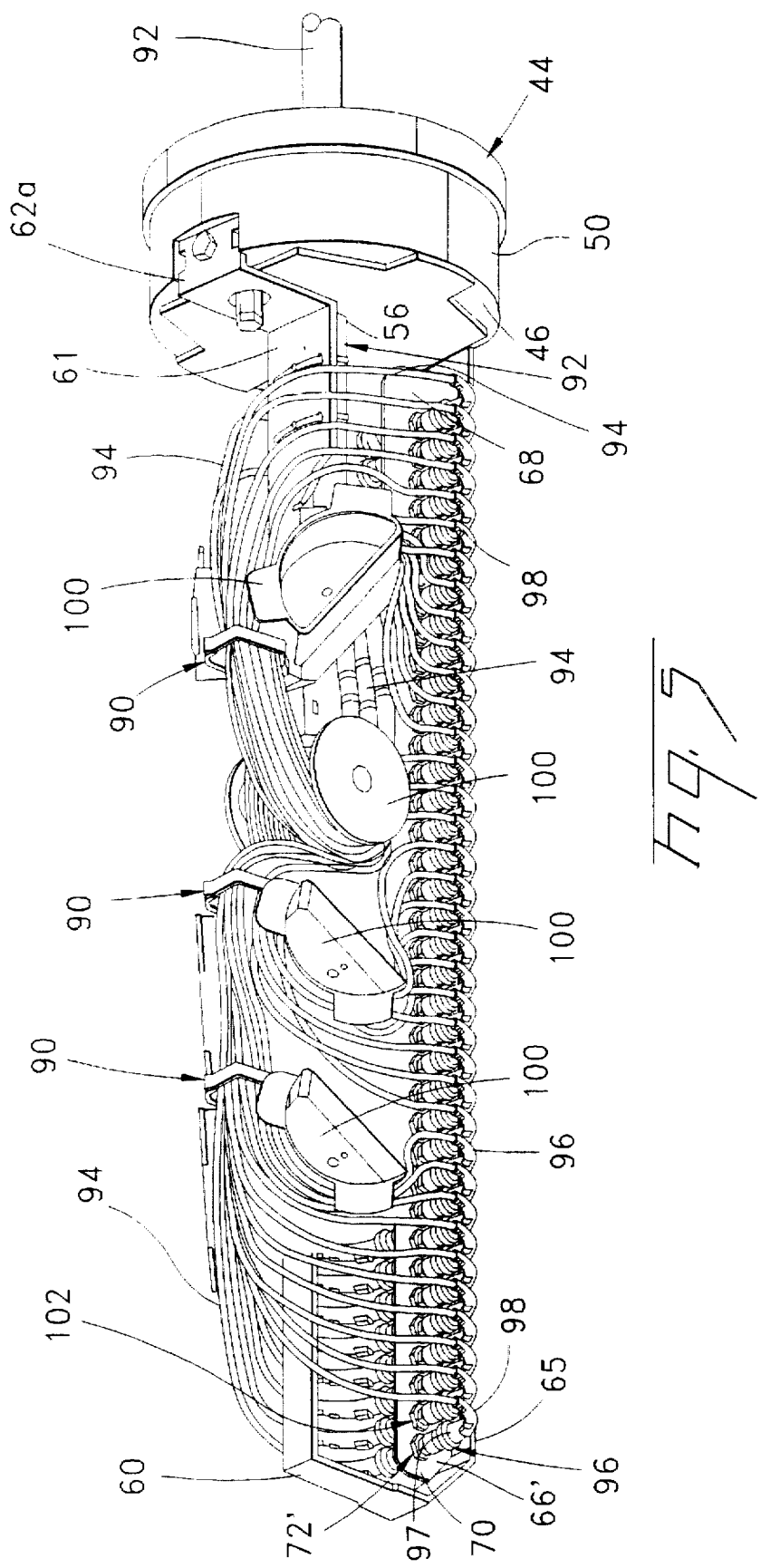

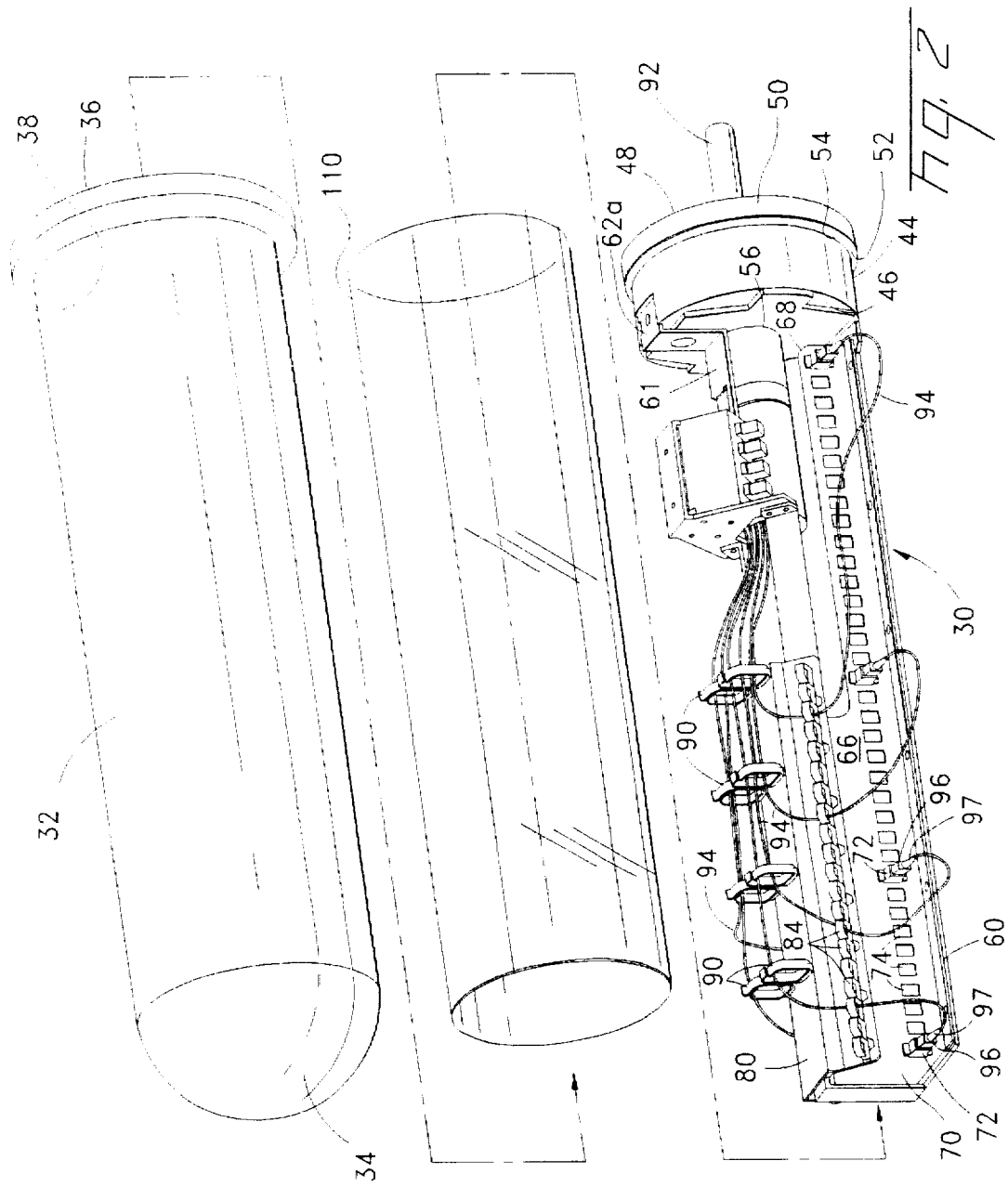

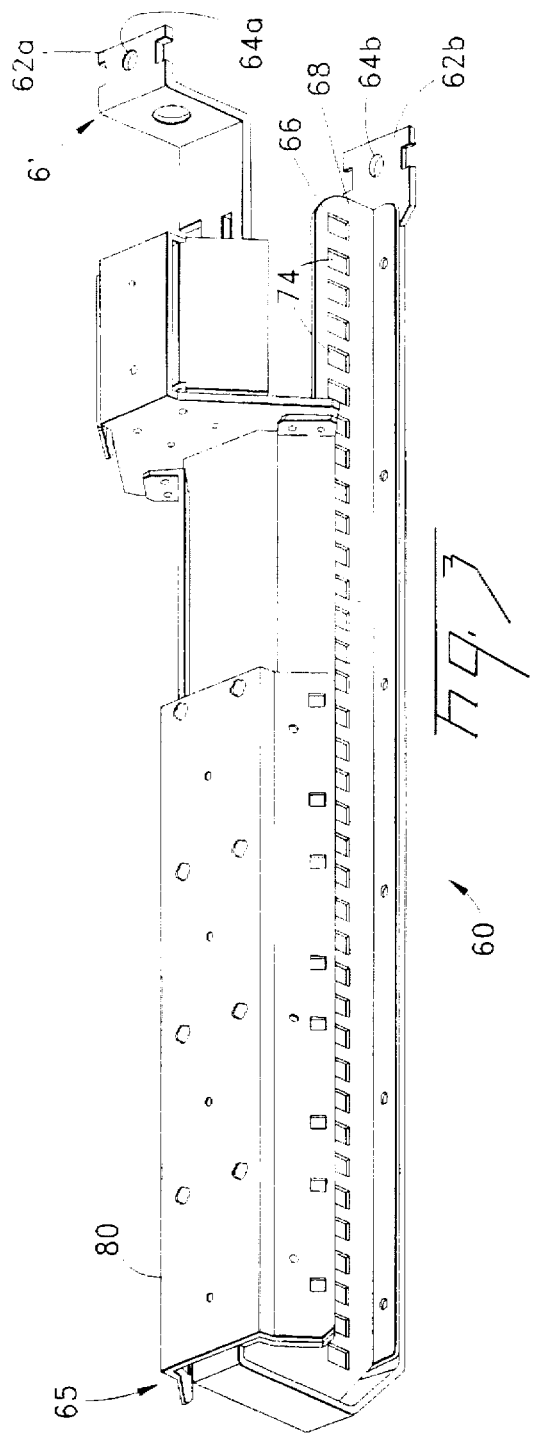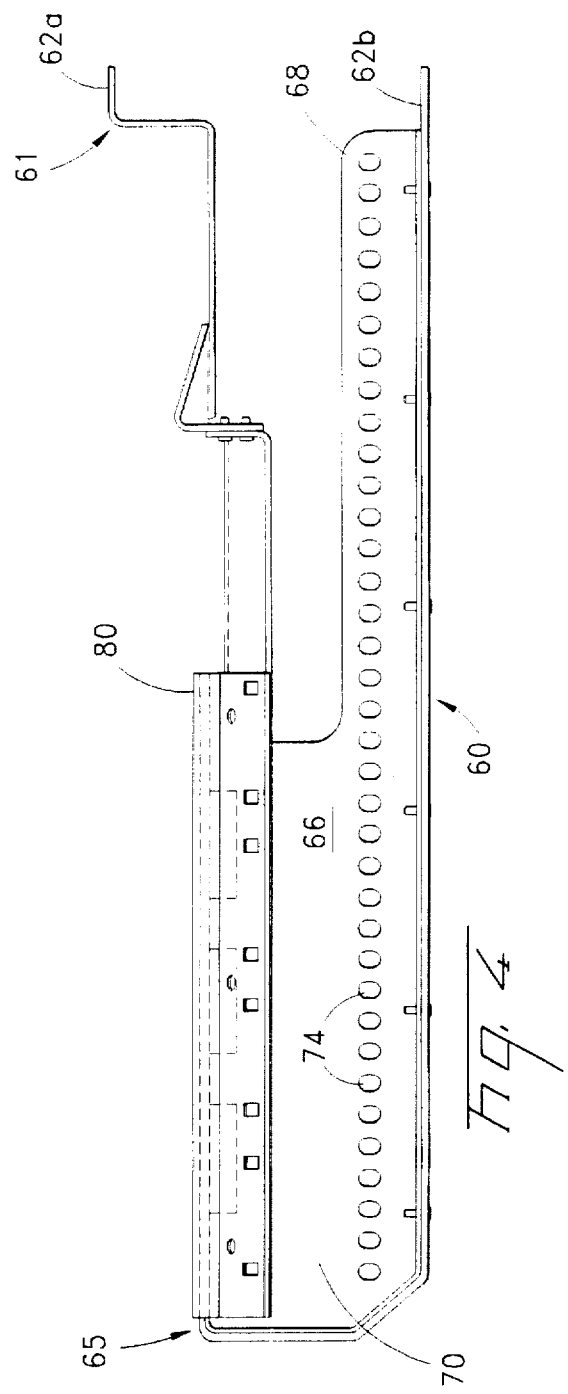

5,790,739

1

OPTICAL FIBER INTERCONNECT AND CANISTER CLOSURE ASSEMBLY

TECHNICAL FIELD OF THE INVENTION

The present invention relates to an optical fiber interconnect and canister closure assembly. In one aspect, connectorized optical fiber pigtails are interconnected on an interconnect assembly designed for use in a canister closure of the type used for optical splice closures.

BACKGROUND OF THE INVENTION

Interconnection of optical fibers from two cables can be achieved in a variety of ways such as distribution frames and splice closures. One type of splice closure is the canister type which is typically designed for an outdoor environment and is commonly used in a ring architecture fiber network. An optical fiber ring network must be readily reconfigureable to accommodate continual changes to the network. Typically, splice closures are located at various points in the network to allow for such reconfiguration. Canister splice closures are used because of their compact dimensions and ability to be reentered and yet remain environmentally sealed upon reclosure. However, it is disadvantageous to reconfigure fibers joined in a splice closure because it requires that the splices be broken and the fibers respliced to other fibers which is time consuming and cumbersome. Furthermore, as reconfigurations of splice closures occur over time, it becomes more and more difficult to properly identify and manage the fibers.

While interconnect panels and cabinets used in fiber distribution frames allow for ready reconfiguration, identification and management of fibers, the interior of a canister closure is not large enough to house such connector panels and cabinets. Therefore, a need exists for an apparatus and method for enclosing and interconnecting fibers such that they can be readily reconfigured and identified yet retain the benefits of a canister closure's size, reenterability and environmental sealing.

SUMMARY OF THE INVENTION

The present invention provides an apparatus and method for interconnecting fibers in a canister closure thereby eliminating the need to break and remake splices to reconfigure the interconnections in the closure. In one aspect, an optical fiber interconnect and canister closure assembly is provided for interconnecting optical fibers of optical cable. The assembly comprises a generally tubular canister with a first end and a second end opposite thereto that define a longitudinal direction. The canister further defines an interior. The assembly also comprises an end cap that is sized to close the first end of the canister. The end cap has an inside surface toward the interior of the canister, and the end cap defines at least one opening dimensioned for passage of at least one optical fiber cable therethrough.

The assembly also comprises an interconnect assembly that extends in the longitudinal direction from the inside surface of the end cap and is sized to be received within the interior of the canister. The interconnect assembly has an adapter mount extending generally in the longitudinal direction. At least one plurality of optical fiber connector adapters are mounted to the adapter mount in a row. The row is oriented generally in the longitudinal direction and each of the at least one plurality of adapters is oriented unparallel to the longitudinal direction.

In another aspect of the present invention, an interconnect assembly is provided that is suitable for use in a canister closure. The interconnect assembly has a bracket assembly with a proximal end for mounting to the end cap of a canister and a distal end opposite thereto. The bracket assembly is dimensioned such that it can be received in the canister when the end cap is mounted to the canister. The interconnect assembly has an adapter mount on the bracket assembly that extends generally in the longitudinal direction. At least one plurality of optical fiber connector adapters are mounted to the adapter mount in a row. The row is oriented generally in the longitudinal direction and each of the adapters is oriented unparallel to the longitudinal direction.

In another aspect of the invention, a method is provided for interconnecting a plurality of first optical fibers from a first optical cable to a plurality of second optical fibers from a second optical cable. The method comprises passing an end of the first cable and an end of the second cable through an end cap of a canister closure that has a canister with an interior that is closed by the end cap. The ends of the first and second cables are stripped to create a first set of optical fiber pigtails from the first optical fibers and a second set of optical fiber pigtails from the second optical fibers. Optical fiber connectors are installed on the end of each pigtail. Connectors from the first set of pigtails are connected to a respective one of a plurality of connector adapters arranged in a row along an adapter mount carried on an interconnect assembly extending from the end cap. Each of the adapters are oriented unparallel to the direction of the row of adapters. The interconnect assembly is sized to be slideably received in the canister closure when the end cap is mounted to the canister. Connectors of the second set of pigtails are connected to the other side of the desired one of the plurality of connector adapters thereby interconnecting the first fibers with the second fibers. The canister is slid over the interconnect assembly and into engagement with the end cap to environmentally seal the interior of the canister.

The above embodiments can also include a plurality of fiber guides to route the pigtails to the adapters. The fiber guides can be located such that the pigtails are of equal length and whereby any pigtail can be connected to any adapter thereby allowing complete reconfigurability of the interconnect. These aspects and embodiments of the present invention provide a readily reconfigurable interconnect in the same envelope of space provided by a canister splice closure thereby taking advantage of the environmental sealing and compact dimensions of canister closures.

BRIEF DESCRIPTION OF THE DRAWINGS

FIG. 2 is a perspective view of the preferred embodiment of the optical fiber and canister closure interconnect assembly of the present invention with the canister exploded;

FIG. 3 is a perspective view of an embodiment of the interconnect assembly of the present invention;

FIG. 4 is a side view of a portion of the interconnect assembly of FIG. 4; and

FIG. 5 is a perspective view of an alternative embodiment of the optical fiber and canister closure interconnect assembly of the present invention with optical fiber cables fully interconnected thereon.

DETAILED DESCRIPTION

Figure 1:
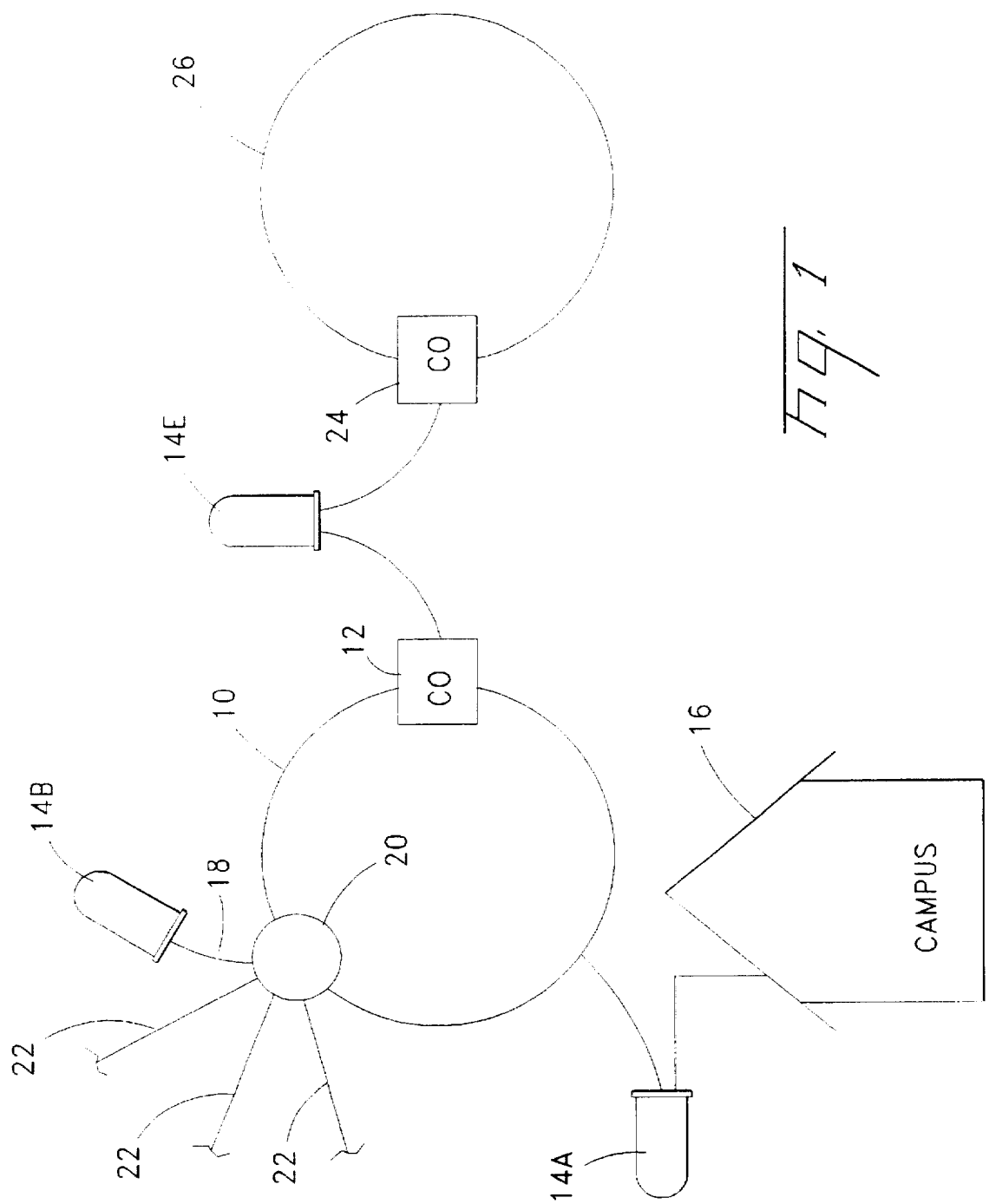
FIG. 1 is a schematic of an optical fiber network architecture showing applications for the present invention.

With reference to FIG. 1, a schematic of an example architecture using optical fiber interconnect and canister closure assemblies 14a, b and c of the present invention are shown. A first fiber ring 10 runs from first central office 12. A first interconnect and closure assembly 14a of the present invention is shown interposed between ring 10 and a campus 16. In this arrangement, the connections between the campus and the fiber ring can be readily reconfigured or supplemented. A second interconnect and closure assembly 14b of the present invention is shown with stub 18 that is spliced into a conventional splice closure 20 which distributes the optical signal to multiple laterals 22 off of the ring. The arrangement of the laterals can be reconfigured in the interconnect and closure assembly 14b instead of having to disturb splice closure 20 by virtue of the signal path being routed through interconnect and closure assembly 14b. A third interconnect and closure assembly 14c is shown interconnecting first central office 12 with second central office 24 from which second fiber ring 26 is run. As can be seen, interconnect and closure assemblies 14a, b and c can provide an environmentally sealable and readily reconfigureable interconnect closure for several different applications.

FIGS. 2–4 show the preferred embodiment of optical fiber interconnect and canister closure assembly 30 and interconnect assembly 60 of the present invention with optical fiber cable only partially depicted. FIG. 5 shows an alternative embodiment depicting optical fiber cables completely interconnected on an interconnect assembly 60.

With reference to FIGS. 2–4, optical fiber interconnect and canister closure assembly 30 has generally tubular canister 32 with closed end 34 and open end 36. The longitudinal direction is defined as extending from closed end 34 to open end 36. Canister 32 defines interior 38. End cap 44 is sized to close open end 36 of canister 32. End cap has inside surface 46 toward the interior of canister 32, outside surface 48 opposite thereto, and periphery 50. In this embodiment, end cap 44 is disk shaped with periphery 50 being a circumferential surface with step 52 so as to define shoulder surface 54 against which open end 36 of canister 32 abuts when canister 32 is properly installed on end cap 44. End cap 44 defines at least one opening 56 for passage of an optical fiber cable therethrough (See FIG. 5). The structure and mating relationship of canister 32 and end cap 44 may be of any arrangement that suitably seals the canister.

Extending from inside surface 46 of end cap 44 is interconnect assembly 60. Interconnect assembly 60 is shown alone in FIGS. 3–4. Assembly 60 has proximal end 61 connected to end cap 44 by mounting legs 62a and b with mounting holes 64a and b for bolting to periphery 50 of end cap 44. Assembly 60 has distal end 65 cantilevered in the longitudinal direction for enclosure in canister 32 proximal closed end 34 of canister 32.

Interconnect assembly 60 comprises adapter mount 66 extending in the longitudinal direction and has proximal end 68 toward inside surface 46 of end cap 44 and distal end 70 opposite thereto. Adapter mount 66 is preferably a long narrow plate piece. A plurality of adapters 72 are mounted to adapter mount 66. Adapters 72 may be any type of optical fiber connector adapter. FIG. 2 depicts representative SC adapters 72 mounted on adapter mount 66. FIG. 5 depicts a plurality of ST adapters 72' mounted along the entire length of adapter mount 66'.

Preferably, adapter mount 66 defines a plurality of mounting holes 74 through which an adapter is inserted and attached in a perpendicular orientation to adapter mount 66. For example, holes 74 are rectilinear to receive an SC connector adapter. Further in conjunction with the preferred embodiment, holes 74 are arranged in a single row extending in the longitudinal direction. This arrangement provides a minimal cross-section for interconnect assembly 60.

While one example of adapter mount 66 is depicted, it should be understood that adapter mount 66 may be of a variety of structures as long as it allows for a minimal cross-section of interconnect assembly 60 and the mounting of a plurality of adapters in an arrangement that will accommodate the interconnection of equal length pigtails in any arrangement. For example, a double row of adapters may be used. Also, the adapter mount may only have cut-outs along its length as opposed to holes for mounting of the adapters. Adapter mount 66 may also be a rod with adapters mounted along the rod. Angled adapters may be used instead of more typical straight adapters. Additionally, straight adapters may be oriented at an oblique angle to the adapter mount where, for example, two cables to be interconnected may enter opposite ends of the canister.

Interconnect assembly 60 also comprises fiber management mount 80 oriented in the longitudinal direction generally parallel with adapter mount 66. Fiber clips 84 are mounted in two parallel rows along mount 80. Fiber guides 90 are mounted along the center of mount 80 in between the rows of fiber clips 84. The arrangement of the fiber clips and guides will be better understood with a discussion of the interconnection of optical fibers on interconnect assembly 60.

With reference to FIG. 5, a stub 92 that contains optical fibers to be interconnected enters through end cap 44 via at least one opening 56. The environmental sealing of the entry of stub 92 into canister 32 may be achieved by any suitable means as is well known in the art. Once stub 92 is within interior 38 of canister 32, the individual optical fibers are separated from stub 92 into equal length pigtails 94. Each pigtail 94 is terminated with an optical fiber connector 96 that mates to one of the plurality of adapters 72. An interconnection of two pigtails 94 is achieved when the connector 96 of one pigtail 94 is mated to one side of an adapter 72, and the connector 96 of another pigtail 94 is mated to the other side of the same adapter 72. The embodiments of FIGS. 2 and 5 contain thirty six mounting holes 74 thereby accommodating thirty six interconnections.

Stub 92 may contain optical fibers coming from two different cables to be interconnected. In such case, all the pigtails corresponding to one of the cables may be connected on the same side of adapter mount 66 and all the pigtails corresponding to the other cable may be connected on the other side of adapter mount 66. This allows for ease of identification and organization of the fibers and interconnections.

It also may be desired in certain applications, for example interconnect closure 14b of FIG. 1, to interconnect pigtails that are from the same cable. In such an application, the stub will have fibers corresponding to fibers of one cable. The splices in splice closure 20 can be effectively reconfigured by merely reconfiguring the interconnections in interconnect and closure assembly 14b. The splice closure 20 never has to be disturbed except in the rare instance of adding lines.

To manage the seventy two pigtails involved in thirty six interconnections, the preferred embodiment of FIG. 2 provides fiber clips 84 in two parallel rows. Fiber guides 90 are provided in two parallel rows running in between the two rows of fiber clips 84. Fiber clips 84 and fiber guides 90 are mounted along fiber management mount 80 in generally the half of the interior of the canister toward the closed end. This location of fiber clips 84 and fiber guides 90 accommodates the pigtails 94 even when they are of equal length and regardless of whether the pigtail is being routed to an adapter at proximal end 68 of adapter mount 66 or distal end 70 of adapter mount 66.

Specifically, when a pigtail 94 is to be routed to the adapter nearest end cap 44, the pigtail is routed through the first fiber guide and first fiber clip and then back to the adapter nearest the end cap. In this way the slack of the pigtail is managed in the fiber guide and clip. If a pigtail 94 is to be routed to the adapter furthest from the end cap, the pigtail is routed through all the fiber guides 90 and then through the last fiber clip to the adapter furthest from the end cap. As can be seen, this management is achieved by (1) having the length of the pigtails approximately the length of adapter mount 66 and (2) placing the first fiber clips 84 and guides 90 at approximately the midpoint of the adapter mount. This preferred arrangement allows any pigtail 94 to be routed through the fiber guides and then doubled back through a fiber clip located such that the connector 96 attached to the pigtail can be connected to the desired adapter with enough slack in the fiber to provide for a proper bend radius but not so much slack that the fibers become entangled.

With reference to FIG. 5, an alternative fiber management is shown where a plurality of fiber spools 100 are used in conjunction with fiber guides to take up fiber slack of pigtails 94.

A preferred additional feature of fiber management is shown in FIG. 5 where fiber guide sleeves 98 are used to route the fiber through a turn without exceeding the minimum bend radius for the fiber. Sleeves 98 are rigid and curved at the appropriate radius. Sleeves 98 have a narrow slot that allows insertion of the fiber into the sleeve and then the sleeve can be slid along the fiber until one end slides over and into frictional engagement with boot 97 extending from connector 92. By using sleeves 98, the minimum bend radius is not exceeded while at the same time there is no excess bowing out of fiber to interfere with the installation of canister 32 onto end cap 44.

Another preferred fiber management feature is the use of shield tube 110 shown in FIG. 1 which is made of a transparent sheet of material configured into a tube. Tube 110 has an inner diameter large enough to slide over interconnect assembly 60 and protect the fiber pigtails and connectors from being snagged or jarred during insertion of interconnect assembly 60 into canister 32. Tube 110 has an outer diameter to be received into canister 32. With tube 110 being transparent, pigtails and connectors can be observed after tube 110 is installed to insure none of the pigtails or connectors were damaged during installation of tube 110.

Another aspect of the present invention is a method for interconnecting optical fiber cables as described for the operation of the interconnect closure above.

Although the present invention has been described with respect to certain embodiments, various changes, substitutions and modifications may be suggested to one skilled in the art and it is intended that the present invention encompass such changes, substitutions and modifications as fall within the scope of the appended claims.

I claim:

1. An optical fiber interconnect and canister closure assembly for interconnecting optical fibers of optical fiber cables, comprising:
   (a) a generally tubular canister with a first end and a second end opposite thereto and defining a longitudinal direction extending from the first end to the second end, the canister further defining an interior;
   (b) an end cap sized to close the first end of the canister, the end cap having an inside surface toward the interior of the canister and defining at least one opening dimensioned for passage of at least one of the optical fiber cables therethrough;
   (c) an interconnect assembly extending longitudinally from the inside surface of the end cap, the interconnect assembly sized to be received within the interior of the canister, the interconnect assembly comprising:
      (i) an adapter mount extending generally in the longitudinal direction; and
      (ii) at least one plurality of optical fiber connector adapters mounted to the adapter mount in a row, the row being oriented generally in the longitudinal direction with each of the at least one plurality of adapters oriented unparallel to the longitudinal direction;
   (d) a fiber management mount extending in the longitudinal direction and a plurality of fiber guides mounted to the fiber management mount such that any one of the optical fibers can be guided to any one of the at least one plurality of adapters by being guided through at least one of the plurality of fiber guides; and
   (e) wherein the adapter mount has a length and a midpoint along the length and wherein the plurality of fiber guides comprises a first row of fiber guides mounted along the fiber management mount, the first row oriented in the longitudinal direction and beginning at a point generally co-extensive with the midpoint of the adapter mount and extending away from the end cap such that all of the optical fibers can be guided along the fiber management mount and particular fibers double-backed around a particular one of the fiber guides to end at the desired adapter for such particular optical fiber.

2. The assembly of claim 1 wherein the plurality of fiber guides further comprises a second row of fiber guides parallel with the first row of fiber guides, and wherein the first row of fiber guides allows for doubling back of optical fibers being routed to one side of the row of adapters and the second row of fiber guides allows for doubling back of fibers being routed to the other side of the row of adapters.

3. The assembly of claim 2 wherein the plurality of fiber guides further includes a third row and a fourth row of fiber guides extending parallel with and between the first and second rows of fiber guides, the third row and fourth row of fiber guides sized to accommodate the routing of several fibers along the fiber management mount until particular fibers are guided to a fiber guide of the first or second row of fiber guides to be double backed to a particular adapter.

4. The assembly of claim 1 further comprising a cable stub passing through the end cap with a stub end outside of the canister and a pigtail end inside the canister, the cable stub having a plurality of optical fibers, the optical fibers being separated from the cable stub at the pigtail end into pigtails and the assembly further comprising an optical fiber connector terminated on the end of each pigtail and wherein each connector of the pigtails are connected to a respective adapter.

5. The assembly of claim 4 further comprising a shield tube for sliding over the interconnect assembly to protect the pigtails from being damaged during insertion of the interconnect assembly into the canister.

6. An optical fiber interconnect assembly for use in a canister closure, the canister closure having a generally tubular canister with a first end and an end cap for closing the first end, the interconnect assembly comprising:
   (a) a bracket assembly having a proximal end for mounting to the end cap and a distal end opposite thereto defining a longitudinal direction extending from the proximal end to the distal end, the bracket assembly dimensioned such that it can be received in the canister when the end cap is mounted to the canister;

(b) an adapter mount on the bracket assembly and extending generally in the longitudinal direction;

(c) at least one plurality of optical fiber connector adapters mounted to the adapter mount in a row, the row being oriented generally in the longitudinal direction with each of the at least one plurality of adapters oriented unparallel to the longitudinal direction;

(d) at least one cable stub having a plurality of optical fibers, separated into a first set of first pigtails and a second set of second pigtails, the assembly further comprising an optical fiber connector terminated on the end of each pigtail, each connector of the first pigtails are connected to one side of a respective adapter and each connector of the second pigtails are connected to the other side of a respective adapter thereby interconnecting the first pigtails to the second pigtails;

(e) a fiber management mount on the bracket assembly extending in the longitudinal direction and a plurality of fiber guides mounted to the fiber management mount and wherein the pigtails are routed through the fiber guides to their respective adapters, wherein the adapter mount has a length and a midpoint along the length and wherein the plurality of fiber guides comprises a first row of fiber guides mounted along the fiber management mount, the first row oriented in the longitudinal direction and beginning at a point generally co-extensive with the midpoint of the adapter mount and extending toward the distal end and wherein the pigtails are routed along the fiber management mount and particular pigtails are double-backed around a particular one of the fiber guides to end at the respective adapter for such particular pigtail.

7. The assembly of claim 6 wherein the plurality of fiber guides further comprises a second row of fiber guides parallel with the first row of fiber guides, and wherein the pigtails being routed to one side of the row of adapters are routed through the first row of fiber guides and the pigtails being routed to the other side of the row of adapters are routed through the second row of fiber guides.

8. The assembly of claim 6 wherein the pigtails are of equal length.

9. The assembly of claim 6 further comprising a shield tube for sliding over the interconnect assembly to protect the pigtails from being damaged during insertion of the interconnect assembly into the canister.

10. A method of interconnecting a plurality of first optical fibers from a first optical cable to a plurality of second optical fibers from a second optical cable, comprising the steps of:

(a) passing an end of the first cable and an end of the second cable through an end cap of a canister closure that has a canister with an interior that is closed by the end cap;

(b) stripping the ends of the first and second cables to create a first set of optical fiber pigtails from the first optical fibers and a second set of optical fiber pigtails from the second optical fibers;

(c) installing an optical fiber connector on the end of each pigtail;

(d) connecting each of the connectors of the first set of pigtails to a respective one of a plurality of connector adapters arranged in a row along an adapter mount carried on an interconnect assembly extending from the end cap, each of the adapters oriented unparallel to the direction of the row of adapters, the interconnect assembly sized to be slideably received in the canister closure when the end cap is mounted to the canister;

(e) connecting each of the connectors of the second set of pigtails to the other side of the desired one of the plurality of connector adapters thereby interconnecting the first fibers with the second fibers; and (f) sliding the canister over the interconnect assembly and into engagement with the end cap to environmentally seal the interior of the canister.

11. The method of claim 10 wherein the pigtails are created to be equal length.

12. The method of claim 11 further comprising the step of routing the pigtails through a plurality of fiber guides mounted in a row along a fiber management mount that extends in a longitudinal direction.

13. The method of claim 12 wherein any pigtail can be routed to any adapter by routing a particular pigtail to a particular fiber guide and then doubling back the pigtail to the desired adapter.

14. The method of claim 13 wherein the first fiber guide of the row of fiber guides is located at approximately the midpoint of the adapter row and the last fiber guide is located near the end of the adapter row.

15. The method of claim 10 further comprising the step of sliding a shield tube over the interconnect assembly after the interconnection of the pigtails is complete to protect the pigtails from being damaged during insertion of the interconnect assembly into the canister.

16. An optical fiber interconnect and canister closure assembly for interconnecting optical fibers of optical fiber cables, comprising:

(a) a generally tubular canister with a first end and a second end opposite thereto and defining a longitudinal direction extending from the first end to the second end, the canister further defining an interior;

(b) an end cap sized to close the first end of the canister, the end cap having an inside surface toward the interior of the canister and defining at least one opening dimensioned for passage of at least one of the optical fiber cables therethrough; and (c) an interconnect assembly extending longitudinally from the inside surface of the end cap, the interconnect assembly sized to be received within the interior of the canister, the interconnect assembly comprising:

(i) an adapter mount extending generally in the longitudinal direction;

(ii) at least one plurality of optical fiber connector adapters mounted to the adapter mount in a row, the row being oriented generally in the longitudinal direction with each of the at least one plurality of adapters oriented unparallel to the longitudinal direction;

(d) a cable stub passing through the end cap with a stub end outside of the canister and a pigtail end inside the canister, the cable stub having a plurality of optical fibers, the optical fibers being separated from the cable stub at the pigtail end into pigtails and the assembly further comprising an optical fiber connector terminated on the end of each pigtail and wherein each connector of the pigtails are connected to a respective adapter; and (e) a shield tube for sliding over the interconnect assembly to protect the pigtails from being damaged during insertion of the interconnect assembly into the canister.

17. An optical fiber interconnect assembly for use in a canister closure, the canister closure having a generally tubular canister with a first end and an end cap for closing the first end, the interconnect assembly comprising:

(a) a bracket assembly having a proximal end for mounting to the end cap and a distal end opposite thereto defining a longitudinal direction extending from the proximal end to the distal end, the bracket assembly dimensioned such that it can be received in the canister when the end cap is mounted to the canister;

(b) an adapter mount on the bracket assembly and extending generally in the longitudinal direction;

(c) at least one plurality of optical fiber connector adapters mounted to the adapter mount in a row, the row being oriented generally in the longitudinal direction with each of the at least one plurality of adapters oriented unparallel to the longitudinal direction;

(d) at least one cable stub having a plurality of optical fibers, separated into a first set of first pigtails and a second set of second pigtails, the assembly further comprising an optical fiber connector terminated on the end of each pigtail, each connector of the first pigtails are connected to one side of a respective adapter and each connector of the second pigtails are connected to the other side of a respective adapter thereby interconnecting the first pigtails to the second pigtails; and (e) a shield tube for sliding over the interconnect assembly to protect the pigtails from being damaged during insertion of the interconnect assembly into the canister.

* * * * *